United States Patent
Ushiyama

(10) Patent No.: US 9,597,987 B2
(45) Date of Patent: Mar. 21, 2017

(54) VEHICLE SEAT

(71) Applicant: TOYOTA BOSHOKU KABUSHIKI KAISHA, Aichi-ken (JP)

(72) Inventor: Takeshi Ushiyama, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 28 days.

(21) Appl. No.: 14/694,478

(22) Filed: Apr. 23, 2015

(65) Prior Publication Data

US 2015/0307002 A1    Oct. 29, 2015

(30) Foreign Application Priority Data

Apr. 25, 2014  (JP) ................. 2014-091089

(51) Int. Cl.
*B60N 2/68* (2006.01)
*B60N 2/72* (2006.01)
*B60N 2/58* (2006.01)
*B60N 2/64* (2006.01)
*B60N 2/60* (2006.01)

(52) U.S. Cl.
CPC ......... *B60N 2/5825* (2013.01); *B60N 2/6009* (2013.01); *B60N 2/64* (2013.01); *B60N 2/68* (2013.01); *B60N 2/72* (2013.01)

(58) Field of Classification Search
CPC ... B60N 2/5825; B60N 2/5841; B60N 2/6009
See application file for complete search history.

(56) References Cited

U.S. PATENT DOCUMENTS

| | | | | |
|---|---|---|---|---|
| 5,507,460 A * | 4/1996 | Schneider | ........... | A61M 5/1418 24/601.2 |
| 5,651,522 A * | 7/1997 | Davis | ................... | B60H 3/0007 248/221.11 |
| 5,799,970 A * | 9/1998 | Enders | .................. | B60R 21/207 280/728.2 |
| 5,826,312 A * | 10/1998 | Schroder | .............. | B60N 2/5825 24/458 |
| 6,324,732 B1 * | 12/2001 | Arisaka | .................... | B60J 3/023 24/453 |
| 7,287,305 B2 * | 10/2007 | Bednarski | ............ | B60N 2/5825 24/297 |

(Continued)

FOREIGN PATENT DOCUMENTS

| CN | 101523079 | 9/2009 |
|---|---|---|
| CN | 101786432 | 7/2010 |

(Continued)

OTHER PUBLICATIONS

Official Action, along with English-language translation thereof, in CN Appl. No. 201510204961.9 dated Nov. 18, 2016.

*Primary Examiner* — Timothy J Brindley
(74) *Attorney, Agent, or Firm* — Greenblum & Bernstein, P.L.C.

(57) ABSTRACT

A rear end portion of a cushion cover that covers a surface of a seat cushion in a rear end portion thereof is provided with a hook that clips the rear end portion of the cushion cover at a frame wire of the seat cushion, and that is formed with a clip mounting hole for mounting a clip. The clip is mounted to the hook by the clip mounting hole, and an electric wiring is held by the clip.

8 Claims, 5 Drawing Sheets

(56) References Cited

U.S. PATENT DOCUMENTS

| | | | | |
|---|---|---|---|---|
| 7,901,002 B2* | 3/2011 | Mashimo | B60N 2/5825 | 297/218.3 |
| 2002/0070539 A1* | 6/2002 | Yasui | B60N 2/002 | 280/735 |
| 2002/0074845 A1* | 6/2002 | Perske | B60N 2/5825 | 297/452.6 |
| 2007/0257531 A1 | 11/2007 | Mashimo | | |
| 2011/0138582 A1* | 6/2011 | Ogino | B60N 2/5825 | 24/115 R |
| 2012/0174352 A1* | 7/2012 | Tsunoda | B60N 2/5825 | 24/530 |
| 2012/0228903 A1* | 9/2012 | Abe | A47C 7/74 | 297/180.12 |
| 2012/0319448 A1* | 12/2012 | Mineta | B60N 2/5825 | 297/452.1 |
| 2014/0042792 A1* | 2/2014 | Kajiwara | B60N 2/5825 | 297/463.1 |
| 2015/0008716 A1* | 1/2015 | Dry | B60N 2/44 | 297/452.18 |
| 2015/0033516 A1* | 2/2015 | Saiga | B60N 2/5825 | 24/594.1 |
| 2015/0132422 A1* | 5/2015 | Yamada | B29C 31/008 | 425/3 |
| 2015/0175044 A1* | 6/2015 | Akutsu | B60N 2/5825 | 297/452.18 |
| 2015/0239379 A1* | 8/2015 | Yoshida | B60N 2/5685 | 297/180.12 |
| 2015/0307001 A1* | 10/2015 | Sahashi | B60N 2/5825 | 297/218.2 |
| 2015/0307011 A1* | 10/2015 | Ushiyama | B60N 2/5825 | 297/344.1 |
| 2015/0336528 A1* | 11/2015 | Tanabe | B60R 21/207 | 280/728.2 |
| 2016/0167554 A1* | 6/2016 | Murasaki | B60N 2/5825 | 297/452.61 |
| 2016/0174719 A1* | 6/2016 | Saiga | A47C 31/023 | 24/531 |

FOREIGN PATENT DOCUMENTS

| | | |
|---|---|---|
| CN | 102910097 | 2/2013 |
| JP | 2013-1178 | 1/2013 |
| JP | 2013-171790 | 9/2013 |

* cited by examiner

VEHICLE SEAT

INCORPORATION BY REFERENCE

The disclosure of Japanese Patent Application No. 2014-091089 filed on Apr. 25, 2014 including the specification, drawings and abstract is incorporated herein by reference in its entirety.

BACKGROUND OF THE INVENTION

1. Field of the Invention

The invention relates to a seat mounted on vehicles, including automobiles, aircrafts, ships, trolleys and the like.

2. Description of Related Art

An electric wiring of an electric part such as a seating sensor equipped in a vehicle seat is configured at a vehicle floor side via a rear end portion of the seat cushion (see Japanese Patent Application Publication No. 2013-171790 (JP 2013-171790 A)). Such an electric wiring is held by a surface fastener and a clip that are assembled in a cushion cover in a rear end portion of the seat cushion. In a case where the surface fastener is used, the electric wiring is held by being enveloped by the surface fastener. In a case where the clip is used, the electric wiring is held by the clip, and a resin plate for fixing the clip is sewed to the cushion cover in order to mount the clip to the cushion cover.

However, if the surface fastener, the clip and the resin plate for fixing the clip are disposed in the cushion cover only for the purpose of holding the electric wiring, it will increase the number of parts, and also requires the operations of fixing them on the cushion cover. As a result, the seat may have a reduced producibility.

SUMMARY OF THE INVENTION

The invention provides a vehicle seat in which an electric wiring is arranged via a rear end portion of the seat cushion and held by a part in a periphery of a rear end portion of the seat cushion, such that a number of parts for holding the electric wiring in the rear end portion of the seat cushion can be suppressed to increase the producibility of the seat.

An aspect of the invention relates to a vehicle seat in which an electric wiring is arranged via a rear end portion of a seat cushion, wherein a terminal of a cushion cover that covers a surface of the seat cushion in the rear end portion of the seat cushion is provided with a clipping plate which clips the terminal on a skeleton member of the seat cushion and on which a clip mounting hole for mounting a clip is formed, and wherein the clip is mounted to the clipping plate by the clip mounting hole, and the electric wiring is held by the clip.

According to the above aspect, the clip mounting hole is formed on the clipping plate that clips the cushion cover, wherein the clip is mounted by the clip mounting hole, and the electric wiring is held by the clip. Thus, by forming the clip mounting hole only on the clipping plate that is originally disposed for clipping the cushion cover, the additional arrangement of a plate provided with the clip mounting holes for holding the electric wiring is not required, and neither is a surface fastener for holding the electric wiring. It is therefore possible to suppress a number of parts for holding the electric wiring in the rear end portion of the seat cushion, so as to increase the producibility of the seat. Moreover, the clipping plate is in a stable position since it clips at a skeleton member of the seat cushion, such that the electric wiring held by the clipping plate via the clip is always kept in a stable position. Thus, the electric wiring is in a stable connection state, and the possibility of disconnection or loose connection can be suppressed.

In the above aspect, the seat cushion may be configured such that a cushion pad constituted by a soft body is provided between the skeleton member of the seat cushion and the cushion cover for providing a soft seating feeling, a rear end portion of the cushion pad protrudes from its center and two end sides respectively toward a rear of the seat cushion to form protruding portions, the cushion cover is disposed to be separated at least at its terminal by covering a part of the cushion pad other than the protruding portions, the clipping plate is accordingly divided into two parts and disposed corresponding to positions sandwiched by the respective protruding portions, an outer cover that covers the cushion cover is disposed at a surface side of the cushion cover, and the outer cover is configured to have an inner face side supported by the respective protruding portions.

The clipping plate has an increased area due to formation of the clip mounting hole. Thus, an end portion of the clipping plate largely protrudes toward a rear end portion of the seat cushion, and the clipping plate emerges from the surface in an intact shape. According to this aspect, a surface side of the cushion cover which is clipped by the clipping plate is covered with an outer cover, which is supported by three protruding portions from inside to form a shape. Thus, the rear end portion of the seat cushion can have a good appearance.

In the above aspect, an up-down guiding groove, which guides the electric wiring coming from a center of a surface portion of the seat cushion from an upper side toward a lower side, may be formed on a rear side surface of the protruding portion at the center of the cushion pad.

According to the above aspect, the electric wiring is accommodated within the up-down guiding groove of the protruding portion of the cushion pad, so as to determine a path for the wiring. Thus, there is no deviation in the position of the electric wiring, which is in a stable connection state, such that the possibility of disconnection or loose connection can be suppressed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
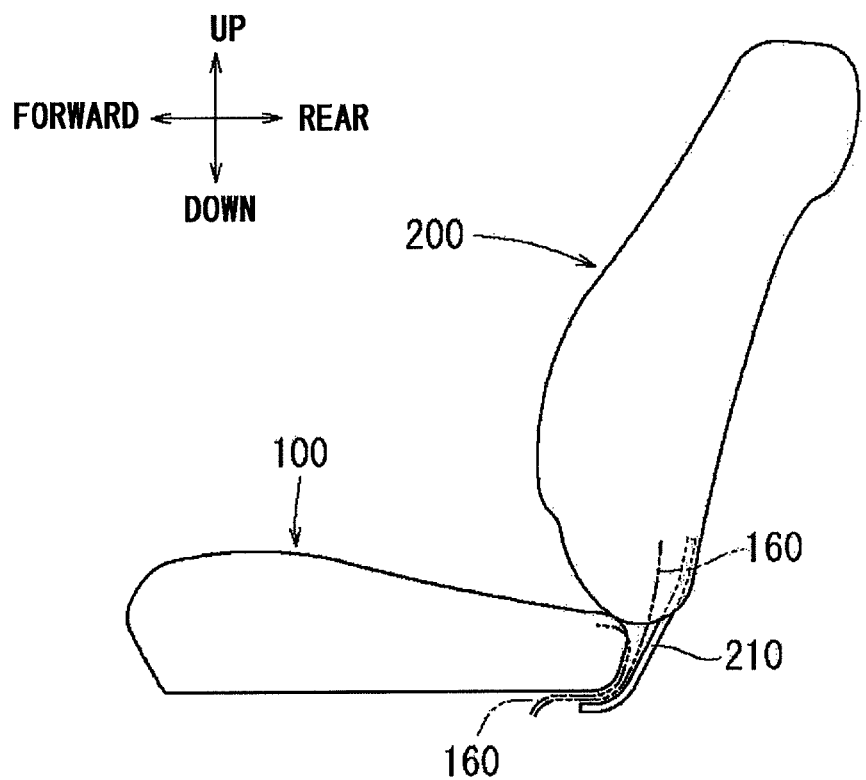
FIG. 1 is a schematic side view showing an automobile seat according to an embodiment of the invention.
Figure 2:
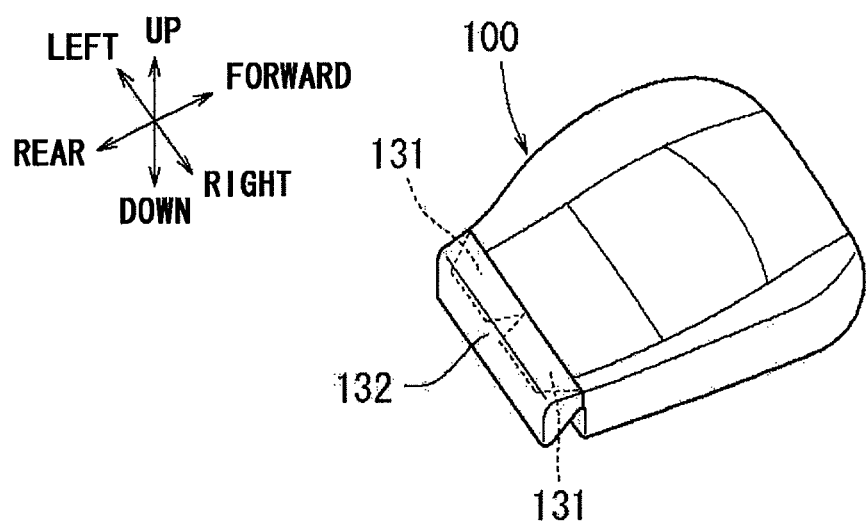
FIG. 2 is a perspective view showing a seat cushion according to the embodiment.

The drawings show an embodiment of the invention. The embodiment shows an example of an automobile seat (hereinafter referred to as "seat") that applies to the invention. In the drawings, arrows denote directions when the seat is provided within an automobile. The descriptions of directions are hereinafter based on the directions denoted by the arrows in the drawings.

Figure 10:
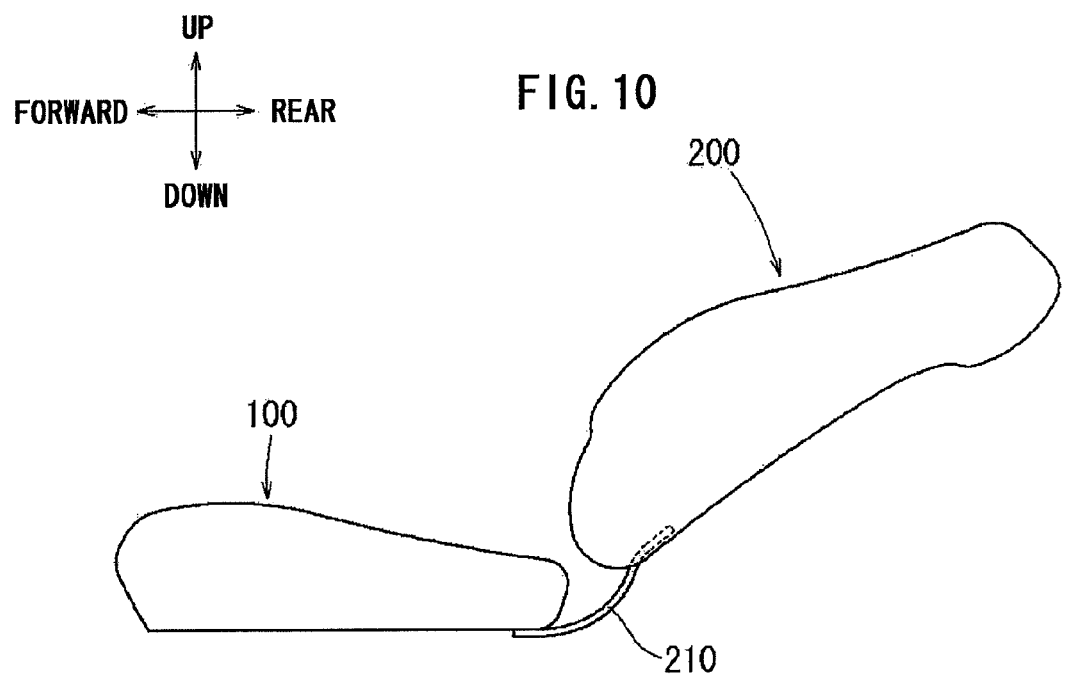
FIG. 10 is a schematic side view showing a state in which the seatback tilts backward in the embodiment.

The seat mainly includes a seat cushion 100 that constitutes a seating portion and a seatback 200 that constitutes a seatback. The seatback 200 is configured to be capable of forwardly and backwardly adjusting a tilting angle relative to the seat cushion 100 at its lower end portion. FIG. 1 shows a state in which the seatback 200 is normally used, and FIG. 10 shows a state in which the seatback 200 tilts backward. As shown in FIGS. 1 and 10, a back face cover 210 is disposed between a back face side of a lower end portion of the seatback 200 and a lower surface side of a rear end portion of the seat cushion 100, and the vicinity of a border potion between the seatback 200 and seat cushion 100 is covered without being seen from the back face side.

Figure 5:
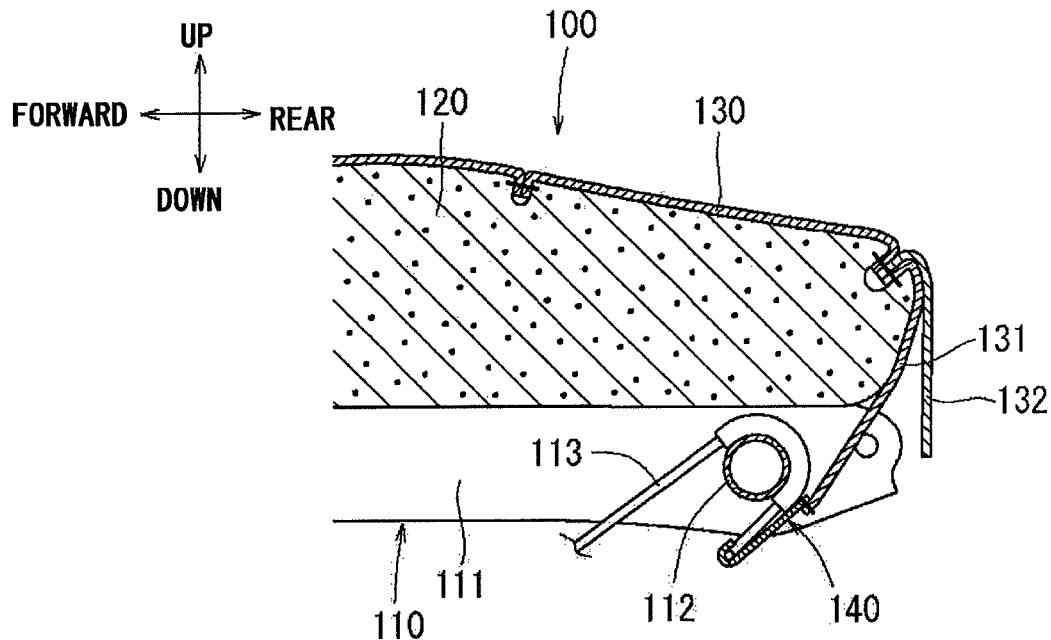
FIG. 5 is an amplified sectional view along a line V-V of FIG. 3.

For elaborating a structure of the seat cushion 100, as shown in FIG. 5, the seat cushion 100 is integrated so that a cushion pad 120 disposed on a cushion frame 110 is covered by a cushion pad 120. The cushion frame 110 is configured to have a frame-like shape by combining left and right side frames 111 with a front plate (not shown in the drawings) in the front side and a rear pipe 112 in the rear side. A frame wire 113 is disposed within the frame-like shape of the cushion frame 110, and supports a lower surface of the cushion pad 120. The respective end portions of the cushion cover 130 that covers the cushion pad 120 clips to the cushion frame 110 and the like by a hook 140 (corresponding to the clipping plate in the invention) sewed to said end portions. A rear end portion 131 of the cushion cover 130 in the rear end portion of the seat cushion 100 clips to the frame wire 113 via the hook 140.

Figure 3:
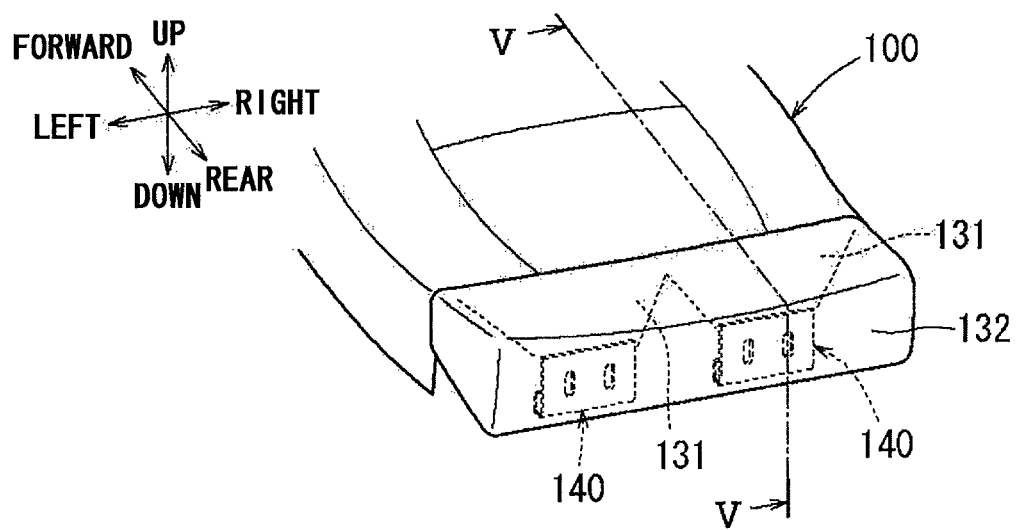
FIG. 3 is a perspective view showing a rear end portion of the seat cushion according to the embodiment.
Figure 4:
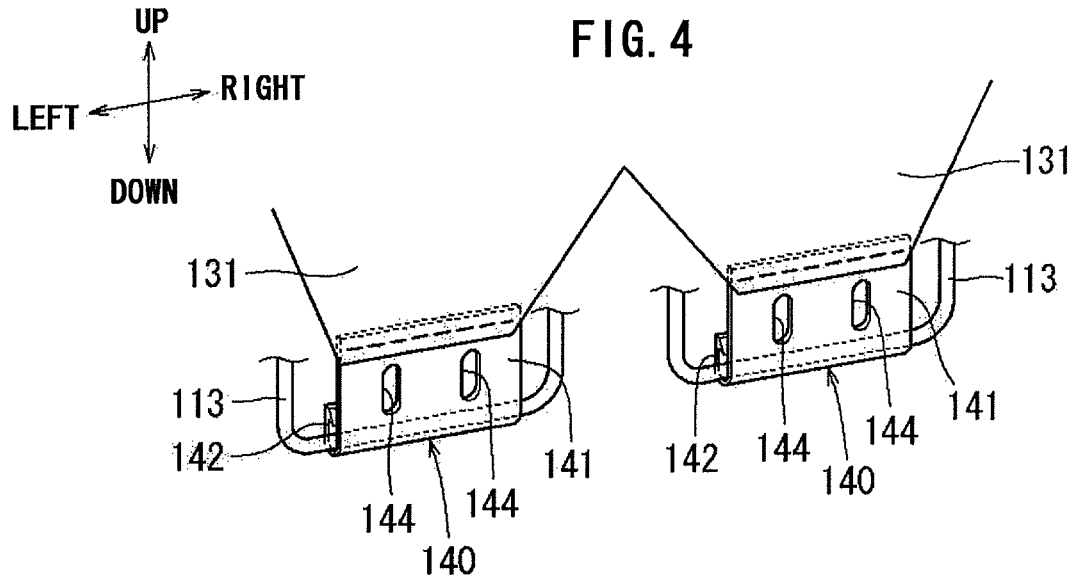
FIG. 4 is an amplified perspective view showing the vicinity of a clipping plate according to the embodiment.
Figure 9:
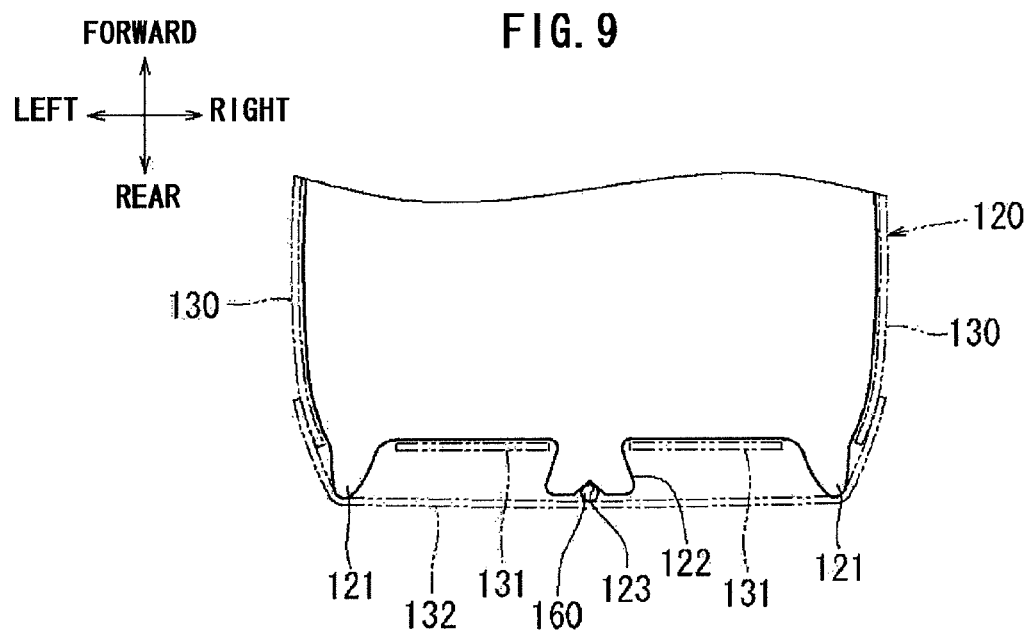
FIG. 9 is a top view of a cushion pad according to the embodiment.

As shown in FIG. 9, the center and two end sides of the rear end portion of the cushion pad 120 protrude respectively toward a rear of the seat cushion 100 to form protruding portions 121, 122. On the other hand, as shown in FIGS. 3 and 9, the rear end portions 131 of the cushion cover 130 are disposed as two parts separated from each other in a left-right direction so as to cover the rear end portions of the cushion pad 120 other than the protruding portions 121, 122. Thus, correspondingly, the hook 140 is divided into two parts, which are disposed at the lower end portions of the rear end portions 131 in positions corresponding to positions sandwiched by the protruding portions 121, 122. A carpet 132 (corresponding to the outer cover in the invention) is provided at the rear end portion of the seat cushion 100 and at a surface side of the cushion cover 130, which covers the cushion cover 130 and is configured to have a container-like shape by covering the protruding portions 121, 122. The carpet 132 is constituted by material with higher rigidity than the cushion cover 130, and the container-like shape can be kept even if the carpet is locally supported by the protruding portions 121, 122 from an inner face side.

Figure 6:
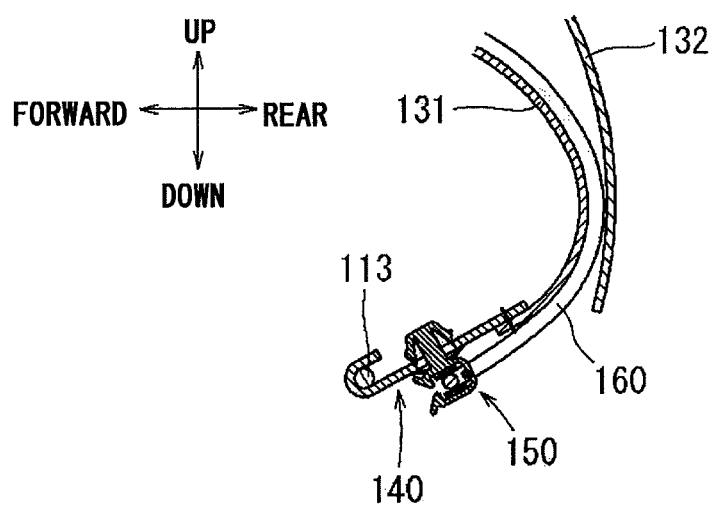
FIG. 6 is an amplified diagram showing the vicinity of the clipping plate of FIG. 5.
Figure 7:
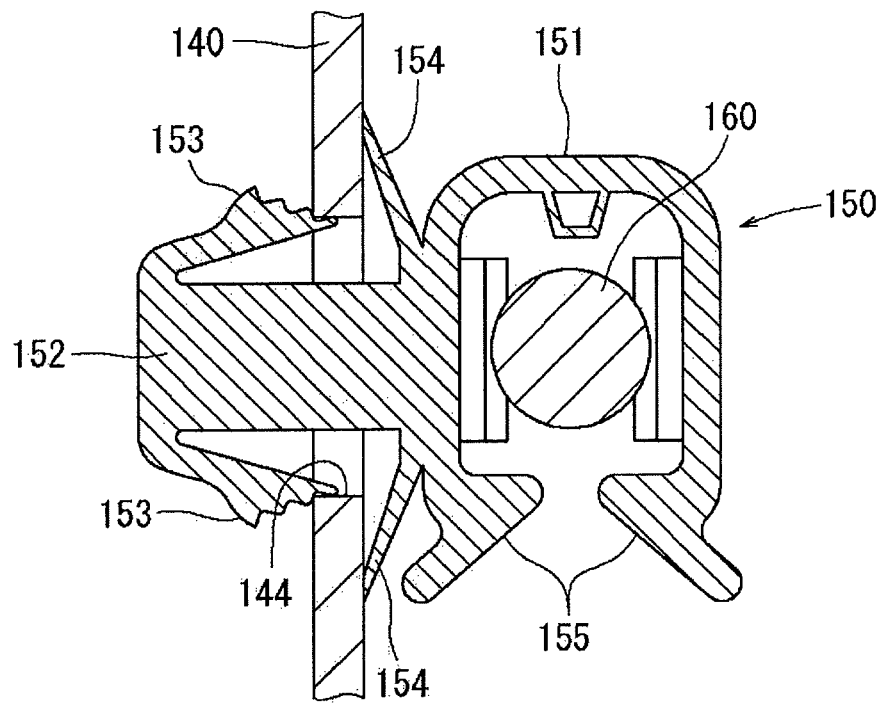
FIG. 7 is an amplified diagram showing the vicinity of a clip of FIG. 6.
Figure 8:
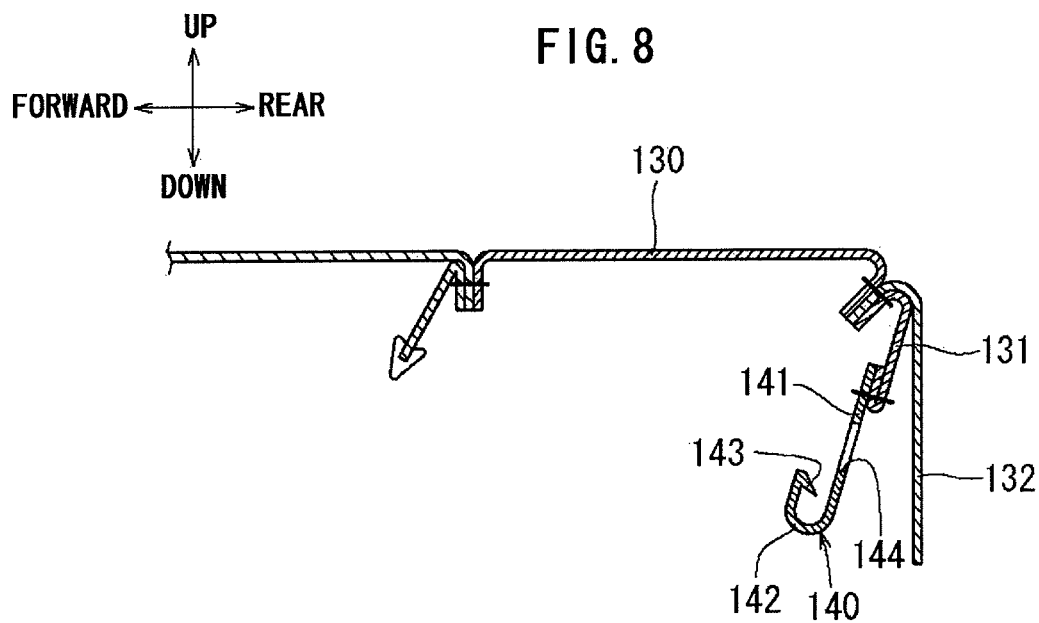
FIG. 8 is an illustrative diagram illustrating the sewing of a cushion cover according to the embodiment.

As shown in FIGS. 3-6 and 8, each of the hooks 140 is configured to have a cross section in a J-shape so as to be capable of clipping at the frame wire 113, and a hook portion 143 is formed in a tip end portion 142 thereof, so as to prevent the clipping state from being released. Moreover, two oval-shaped clip mounting holes 144, which are elongated in the up-down direction, are arranged in the left-right direction and formed by penetrating through base portions 141 of the hooks 140, respectively. As shown in FIGS. 6 and 7, the clip 150 is mounted into the clip mounting hole 144. It is to be noted that, in FIG. 4, the diagrams of the clip mounting holes 144 are omitted; in FIGS. 4 and 5, the diagrams of the clip 150 and the electric wiring 160 are omitted; and in FIG. 6, the diagrams of the cushion frame 110 and the cushion pad 120 are omitted.

The clip 150 is a well-known structure, and as shown in FIG. 7, a main body portion 151 is integrally provided with a clipping portion 152 and configured as a cylinder with one face open for holding the electric wiring 160, and the clipping portion 152 is configured to be inserted into the clip mounting holes 144 of the hook 140. A pair of clipping tabs 153 are disposed at a tip end side of the clipping portion 152, and an umbrella portion 154 that expands in an umbrella-like shape is disposed at a side end portion of the main body portion 151. Thus, when the clipping portion 152 is inserted into the clip mounting hole 144, the clip 150 is mounted to the hook 140 by the pair of clipping tabs 153 and the umbrella portion 154 in such a manner that the clip 150 cannot be easily detached. Guiding portions 155 are disposed on an open face of the main body portion 151, such that the electric wiring 160 can be smoothly inserted into the main body portion 151.

The electric wiring 160 is a wiring of electric parts which are equipped with the seat cushion 100 and seatback 200, and as shown in FIG. 1, the wiring is arranged from the seat cushion 100 and the seatback 200 toward a floor of the automobile. In this case, the electric wiring 160 is held by the main body portion 151 of the clip 150 via the rear end portion of the seat cushion 100. Moreover, the electric wiring 160 arranged through a center of the rear end portion of the seat cushion 100 is locally accommodated within an up-down guiding groove 123 formed on a rear side surface of the protruding portion 122 in a center portion of the cushion pad 120 as shown in FIG. 9, and is guided from an upper portion toward a lower portion in a center of the rear end portion of the seat cushion 100.

As described above, in the aforesaid embodiment, the clip mounting holes 144 are formed on the hook 140 for clipping the rear end portion 131 of the cushion cover 130 at the frame wire 113. The clip mounting holes are used to mount the clip 150. The electric wiring 160 is held by the clip 150. Thus, by forming the clip mounting holes 144 only on the hook 140 that is originally disposed for clipping the cushion cover 130, the additional arrangement of a plate provided with the clip mounting holes for holding the electric wiring 160 as a conventional structure is not required. In addition, a surface fastener for holding the electric wiring 160 is not required. It is therefore possible to suppress the number of parts for holding the electric wiring 160 in the rear end portion of the seat cushion 100, so as to increase the producibility of the seat. Moreover, the hook 140 is in a stable position since it clips at the frame wire 113 that serves as a skeleton member of the seat cushion 100, such that the electric wiring 160 held by the hook 140 via the clip 150 is always kept in a stable position as well. Thus, when the electric wiring 160 is in a stable connection state, the possibility of disconnection or loose connection can be suppressed.

In addition, the surface side of the cushion cover 130 that is clipped by the hook 140 is covered with the carpet 132, the carpet 132 is supported by three protruding portions 121, 122 from inside of the carpet 132 so that the carpet 132 is formed in a certain shape. Thus, the rear end portion of the seat cushion 100 can have a good appearance. Since the rear end portion of the seat cushion 100 is covered with a back face cover 210 as shown in FIGS. 1 and 10, it can barely be seen from the outer side of the seat, but can be seen from above the seat under the circumstance that the seatback 200 is titled backward to a larger extent as shown in FIG. 10. However, in the embodiment, the rear end portion of the seat cushion 100 is covered with the carpet 132, thereby the hook 140, the clip 150 and the electric wiring 160 are not visible.

In addition, a part of the electric wiring 160 passing through the rear end portion of the seat cushion 100 is accommodated within the up-down guiding groove 123 of the protruding portion 122 of the cushion pad 120 for determining a path for the wiring. Thus, there is no deviation in the position of the electric wiring 160, which is in a stable connection state, such that the possibility of disconnection or loose connection can be suppressed.

Although particular embodiments are illustrated above, the invention is not limited to be the aforesaid appearances and structures, and can be subject to all kinds of alteration, addition or deletion without changing the subject matter of the invention. For example, in the aforesaid embodiment, the carpet constitutes the outer cover, which, however, may be constituted by the same material as the cushion cover. Moreover, in the aforesaid embodiment, the invention applies to the automobile seat, but also to the seat mounted on aircrafts, ships, trolleys and the like.

What is claimed is:

1. A vehicle seat, comprising:
    a seat cushion;
    a cushion cover that covers a surface of the seat cushion at a rear end portion of the seat cushion; and
    a clipping plate that is disposed at a terminal end of the cushion cover and clips the terminal end of the cushion cover on a skeleton member of the seat cushion, wherein
    the clipping plate includes a clip mounting hole on which a clip is mounted and the clip is configured to hold an electric wiring, and
    the clip mounting hole is disposed between the terminal end of the cushion cover and a portion of the skeleton member that is clipped to the clipping plate.

2. A vehicle seat, comprising:
    a seat cushion;
    a cushion cover that covers a surface of the seat cushion at a rear end portion of the seat cushion;
    a clipping plate that is disposed at a terminal end of the cushion cover and clips the terminal end of the cushion cover on a skeleton member of the seat cushion, and
    a cushion pad that is provided between the skeleton member of the seat cushion and the cushion cover, wherein
    the clipping plate includes a clip mounting hole for mounting a clip, and is configured to hold an electric wiring by the clip,
    a center and two end sides of a rear end portion of the cushion pad protrude respectively toward a rear of the seat cushion to define protruding portions,
    the terminal end of the cushion cover includes at least two parts that are separated from each other in a left-right direction of the seat cushion so as to cover portions of the rear end portion of the cushion pad excluding the protruding portions,
    the clipping plate is sandwiched by the protruding portions,
    an outer cover, that covers the cushion cover, is disposed at an outer surface of the cushion cover, and
    the outer cover has an inner face side supported by the respective protruding portions.

3. The vehicle seat according to claim 2, wherein an up-down guiding groove, that guides the electric wiring provided at a center of a surface portion of the seat cushion from an upper side toward a lower side, is provided at a rear side surface of the protruding portion at the center of the rear end portion of the cushion pad.

4. The vehicle seat according to claim 2, wherein the outer cover covers the protruding portions.

5. The vehicle seat according to claim 2, wherein the outer cover is constituted by a material with higher rigidity than the cushion cover.

6. The vehicle seat according to claim 1, wherein the clipping plate is configured to be clipped to the skeleton member at a J-cross-sectional shape of the clipping plate.

7. The vehicle seat according to claim 6, wherein the J-cross-sectional shape of the clipping plate defines a hook portion at a tip end portion of the clipping plate that inhibits release of the clipping plate from the skeleton member.

8. The vehicle seat according to claim 1, wherein the clip mounting hole has an oval-shape that is elongated in an up-down direction.

* * * * *